US012325467B2

(12) United States Patent
Cha et al.

(10) Patent No.: US 12,325,467 B2
(45) Date of Patent: Jun. 10, 2025

(54) FRONT PART ASSEMBLY FOR MOBILITY DEVICE, FRONT-PART-INTEGRATED MOBILITY DEVICE INCLUDING THE SAME AND METHOD OF ASSEMBLING THE FRONT-PART-INTEGRATED MOBILITY DEVICE

(71) Applicants: HYUNDAI MOTOR COMPANY, Seoul (KR); KIA CORPORATION, Seoul (KR); HYUNDAI MOBIS CO., LTD., Seoul (KR)

(72) Inventors: Dong Eun Cha, Hwaseong-si (KR); Jin Young Yoon, Gimpo-si (KR); Hong Heui Lee, Suwon-si (KR); Seong Kwon Kim, Hwaseong-si (KR)

(73) Assignees: HYUNDAI MOTOR COMPANY, Seoul (KR); KIA CORPORATION, Seoul (KR); HYUNDAI MOBIS CO., LTD., Seoul (KR)

( * ) Notice: Subject to any disclaimer, the term of this patent is extended or adjusted under 35 U.S.C. 154(b) by 330 days.

(21) Appl. No.: 17/831,001

(22) Filed: Jun. 2, 2022

(65) Prior Publication Data
US 2023/0052158 A1 Feb. 16, 2023

(30) Foreign Application Priority Data
Aug. 11, 2021 (KR) .......................... 10-2021-0106288

(51) Int. Cl.
*B62D 25/12* (2006.01)
*B60K 11/02* (2006.01)
(Continued)

(52) U.S. Cl.
CPC .............. *B62D 25/12* (2013.01); *B60K 11/02* (2013.01); *B62D 25/081* (2013.01);
(Continued)

(58) Field of Classification Search
CPC ............ B60Y 2200/91; B60Y 2304/07; B60Y 2304/05; B60Y 2306/01; B60Y 2304/03;
(Continued)

(56) References Cited

U.S. PATENT DOCUMENTS

| 7,287,797 B1* | 10/2007 | Belloso ................. | B62D 21/03 |
| | | | 296/193.07 |
| 2004/0142232 A1* | 7/2004 | Risca ..................... | B60R 16/04 |
| | | | 429/100 |

(Continued)

FOREIGN PATENT DOCUMENTS

| CN | 112319621 A * | 2/2021 | ............. B60R 21/34 |
| DE | 102007038950 A1 * | 2/2009 | ............. E05B 79/20 |

(Continued)

OTHER PUBLICATIONS

DE-102007038950-A1 computer translation (Year: 2009).*
JP3231293U computer translation (Year: 2021).*

*Primary Examiner* — Daniel J Colilla
(74) *Attorney, Agent, or Firm* — MCDONNELL BOEHNEN HULBERT & BERGHOFF LLP (57) ABSTRACT

A front part assembly for a mobility device, a front-part-integrated assembly including the same, and a process of assembling the same are disclosed. The front part assembly includes a bumper, a fender, and a hood, which are integrally formed, wherein the bumper and the fender are connected to each other to define an internal space therebetween, and the hood is rotatably connected at a front end thereof to the bumper such that a rear end of the hood is rotated vertically to open and close the internal space. The front-part-integrated mobility device includes the front part assembly and a frame, which is coupled to the front part assembly and is coupled to a cowl and a rear fender. The method includes
(Continued)

rotating the hood to open the internal space, coupling the front part assembly to the frame, and rotating the hood to close the internal space.

14 Claims, 10 Drawing Sheets (51) Int. Cl.
*B60R 19/18* (2006.01)
*B62D 25/08* (2006.01)
*B62D 25/10* (2006.01)
*B62D 27/02* (2006.01)
*B62D 65/02* (2006.01)
*B62D 65/16* (2006.01)

(52) U.S. Cl.
CPC ......... *B62D 25/105* (2013.01); *B62D 65/024* (2013.01); *B62D 65/16* (2013.01); *B60R 2019/1886* (2013.01); *B60Y 2304/07* (2013.01)

(58) Field of Classification Search
CPC ............... B60Y 2304/072; E05B 83/24; E05B 47/0003; E05B 53/003; E05B 85/107; B62D 25/08; B62D 25/087; B62D 25/12; B62D 29/043; B62D 25/105; B62D 25/10; B62D 25/081; B62D 65/024; B62D 65/16; B62D 27/023; B62D 65/04; B62D 65/06; B60R 2019/1886; B60R 13/00; B60R 19/52; B60R 2019/525; B60K 11/02; B60S 1/00; B60S 1/02; B60S 1/46; B60S 1/48; B60S 1/50
USPC ........... 180/69.2; 296/193.11, 193.1, 193.09, 296/198, 193.01, 193.04; 292/DIG. 14
See application file for complete search history.

(56) References Cited

U.S. PATENT DOCUMENTS

2007/0257518 A1   11/2007  Matsushima et al.
2018/0009484 A1*  1/2018  Remes ..................... B60S 1/50

FOREIGN PATENT DOCUMENTS

| | | | |
|---|---|---|---|
| EP | 3069966 B1 | | 1/2018 |
| JP | 2001063633 A | * | 3/2001 |
| JP | 2001-122075 A | | 5/2001 |
| JP | 3231293 U | | 3/2021 |
| KR | 2019980006825 U | | 4/1998 |
| KR | 2007-0030971 A | | 3/2007 |
| KR | 2015-0081096 A | | 7/2015 |
| KR | 2019-0101522 A | | 9/2019 |

* cited by examiner

FRONT PART ASSEMBLY FOR MOBILITY DEVICE, FRONT-PART-INTEGRATED MOBILITY DEVICE INCLUDING THE SAME AND METHOD OF ASSEMBLING THE FRONT-PART-INTEGRATED MOBILITY DEVICE

CROSS REFERENCE TO RELATED APPLICATIONS

This application claims the priority benefit of Korean Patent Application No. 10-2021-0106288, filed on Aug. 11, 2021, in the Korean Intellectual Property Office, the disclosure of which is incorporated herein by reference.

BACKGROUND

1. Field

The present disclosure relates to a front part assembly for a mobility device, a front-part-integrated mobility device including the same, and a method of assembling the front-part-integrated mobility device, in which a hood, a bumper, and a fender are integrated into a single component to reduce weight and manufacturing costs thereof and to increase the rigidity thereof, and thus the ability to withstand a collision.

2. Description of the Related Art

In general, a vehicle body is provided at a front portion thereof with a hood. Recently, because environment-friendly vehicles, which are not provided with engines, for example, electrical vehicles, are extensively used, and because it is not possible to reduce the size of devices for driving the vehicles, a portion of an engine compartment serves as a front trunk for accommodating baggage therein, and a hood configured to open and close the front trunk is provided.

Because such a hood is configured such that a bracket assembled with a hood panel and a bracket assembled with a cowl panel are connected to each other via a hinge, the hood is supported by the vehicle body via the hinge so as to be opened and closed while being rotated.

However, because the hood is made of a steel plate having high rigidity and individual hinges are attached to the plate-shaped hood, it is difficult to change the structure of the hood. Furthermore, because the hood is strongly engaged with a hood latch due to its own weight when the hood is closed, a large impact is applied to a vehicle when closing the hood.

In addition, the weight of the hood is increased due to various bracket and hinge structures required in order to mount the hood. Hence, conventional hood structures are difficult to apply to environment-friendly vehicles.

Details described as the background art are intended merely for the purpose of promoting an understanding of the background of the present disclosure and should not be construed as an acknowledgment of the prior art that is already known to those of ordinary skill in the art.

SUMMARY

Therefore, the present disclosure has been made in view of the above problems, and it is an object of the present disclosure to provide a front part assembly for a mobility device, a front-part-integrated mobility device including the same, and a method of assembling the front-part-integrated mobility device, in which a hood, a bumper, and a fender are integrated into a single component so as to reduce the weight and manufacturing costs thereof and to increase the rigidity thereof, and thus the ability to withstand a collision.

In accordance with an aspect of the present disclosure, the above and other objects can be accomplished by the provision of a front part assembly for a mobility device including a bumper, a fender, and a hood, which are integrally formed, wherein the bumper and the fender are connected to each other to define an internal space therebetween and the hood is rotatably connected at a front end thereof to the bumper such that a rear end of the hood is rotated vertically to open and close the internal space.

The bumper, the fender, and the hood may be integrally formed from a plastic material through injection molding.

The hood may include an outer panel, which is rotatably connected to the bumper, and an inner panel coupled to an inner surface of the outer panel, the inner panel being made of a material having higher rigidity than that of the outer panel.

The hood may be provided on the inner surface with a plurality of reservoir tanks.

The plurality of reservoir tanks may include an intermediate reservoir tank and side reservoir tanks disposed at lateral sides of the intermediate reservoir tank, which are arranged in a lateral direction.

The intermediate reservoir tank may be provided with a front bracket at a front end thereof, an inner bracket at an inner end thereof, and an outer bracket at an outer end thereof, wherein the front bracket is disposed in a center of the intermediate reservoir tank and the inner and outer brackets are disposed in a bilaterally symmetrical arrangement.

Each of the side reservoir tanks may be provided with a front bracket at a front end thereof, a rear bracket at a rear end thereof, an inner bracket at an inner side thereof, and an outer bracket at an outer side thereof, wherein the front bracket and the rear bracket are disposed so as to be spaced apart from each other in a direction inclined with respect to a lateral direction, and the inner bracket and the outer bracket are disposed so as to be spaced apart from each other in a direction inclined with respect to a longitudinal direction.

The rear bracket may be disposed so as to be spaced outwards apart from the front bracket, and the inner bracket may be disposed so as to be spaced backwards apart from the outer bracket.

The bumper may be provided with a latch unit, which is configured to selectively allow rotation of the hood and is selectively engaged with a holder provided at a frame, a cowl, or a fender of a mobility device.

The latch unit may include a lever portion provided at the bumper, and a latch portion, which is connected to a wire extending from the lever portion and is disengaged from the holder upon application of pulling force caused by manipulation of the lever portion.

The fender may include a front fender integrally coupled to the bumper and a rear fender fixed to a frame of a mobility device, wherein the front fender and the rear fender are connected to each other by sliding in forward and backward directions.

In accordance with another aspect of the present disclosure, there is provided a front-part-integrated mobility device including a front part assembly including a bumper, a front fender, and a hood, which are integrally formed, wherein the bumper and the front fender are connected to each other to define an internal space therebetween and the hood is rotatably connected at a front end thereof to the bumper such that a rear end of the hood is rotated vertically to open and close the internal space, and a frame, which is coupled at a front portion thereof to the front part assembly and to which a cowl fitted with the hood and a rear fender fitted with the front fender are coupled.

The front fender may be connected to the rear fender by sliding the front fender backwards along the rear fender.

In accordance with a further aspect of the present disclosure, there is provided a method of assembling the front-part-integrated mobility device including rotating the hood of the front part assembly to open the internal space, moving the front part assembly to the front portion of the frame to fit the front fender with the rear fender to thus couple the front part assembly including the front fender to the frame together with the rear fender, and rotating the hood of the front part assembly to close the internal space.

In the operation of moving the front part assembly, the front part assembly may be moved by means of a carrier, which is configured to be detachably coupled to the hood and the bumper of the front part assembly in the state in which the hood is open so as to maintain the state in which the hood is open.

BRIEF DESCRIPTION OF THE FIGURES

The above and other objects, features and other advantages of the present disclosure will be more clearly understood from the following detailed description taken in conjunction with the accompanying drawings, in which.

DETAILED DESCRIPTION

Hereinafter, a front part assembly for a mobility device, a front-part-integrated mobility device including the same, and a method of assembling the front-part-integrated mobility device according to a preferred embodiment of the present disclosure will be described with reference to the accompanying drawings.

Figure 1:
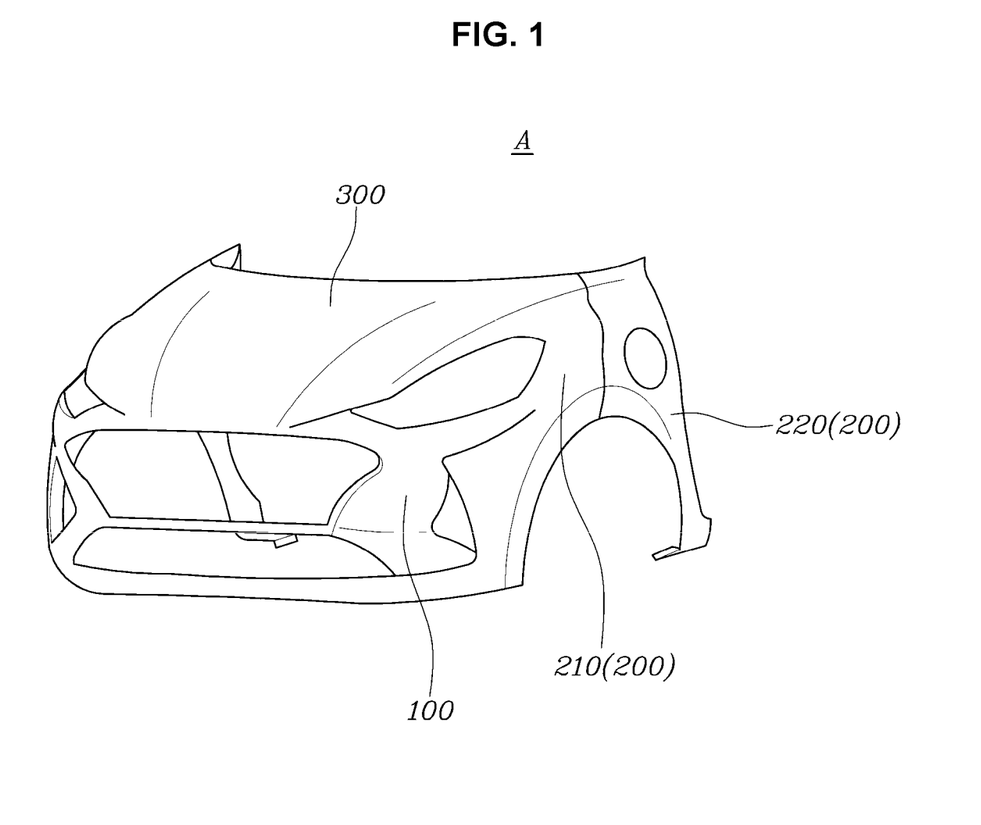
FIG. 1 is a view illustrating a front part assembly for a mobility device according to an embodiment of the present disclosure.
Figure 2:
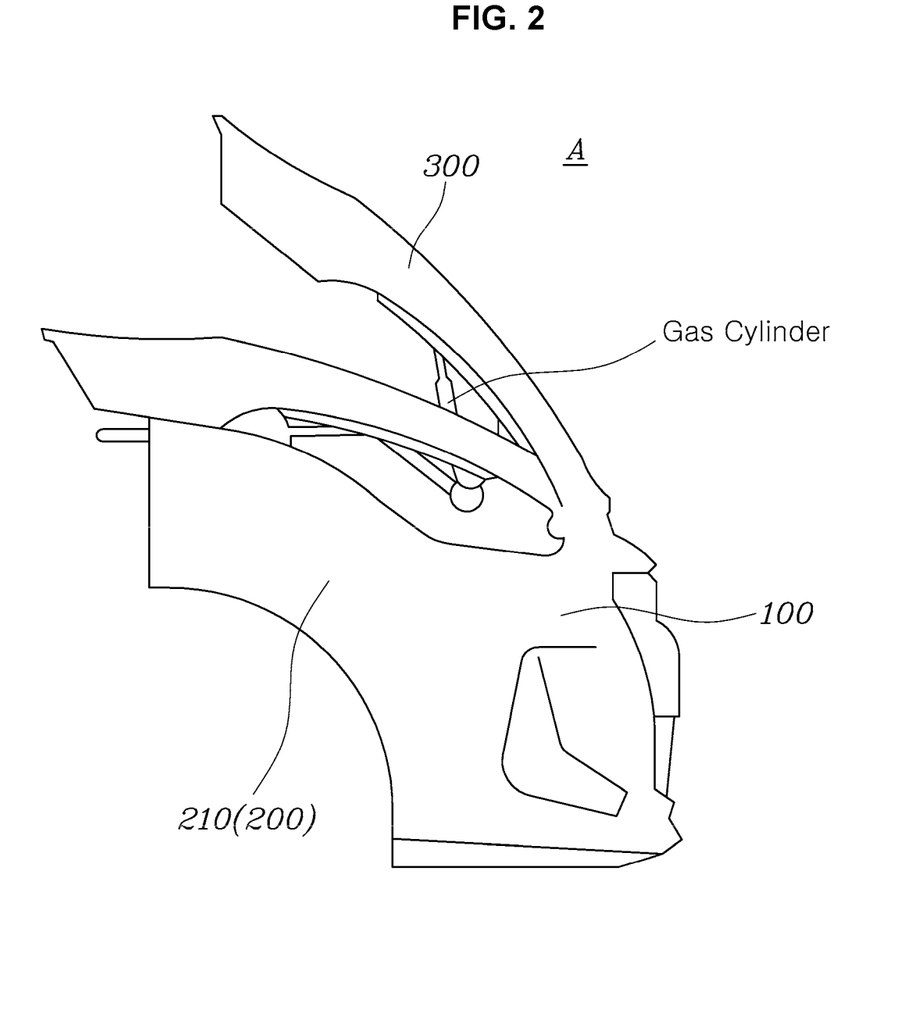
FIG. 2 is a side view of the front part assembly for a mobility device according to the embodiment of the present disclosure.
Figure 3:
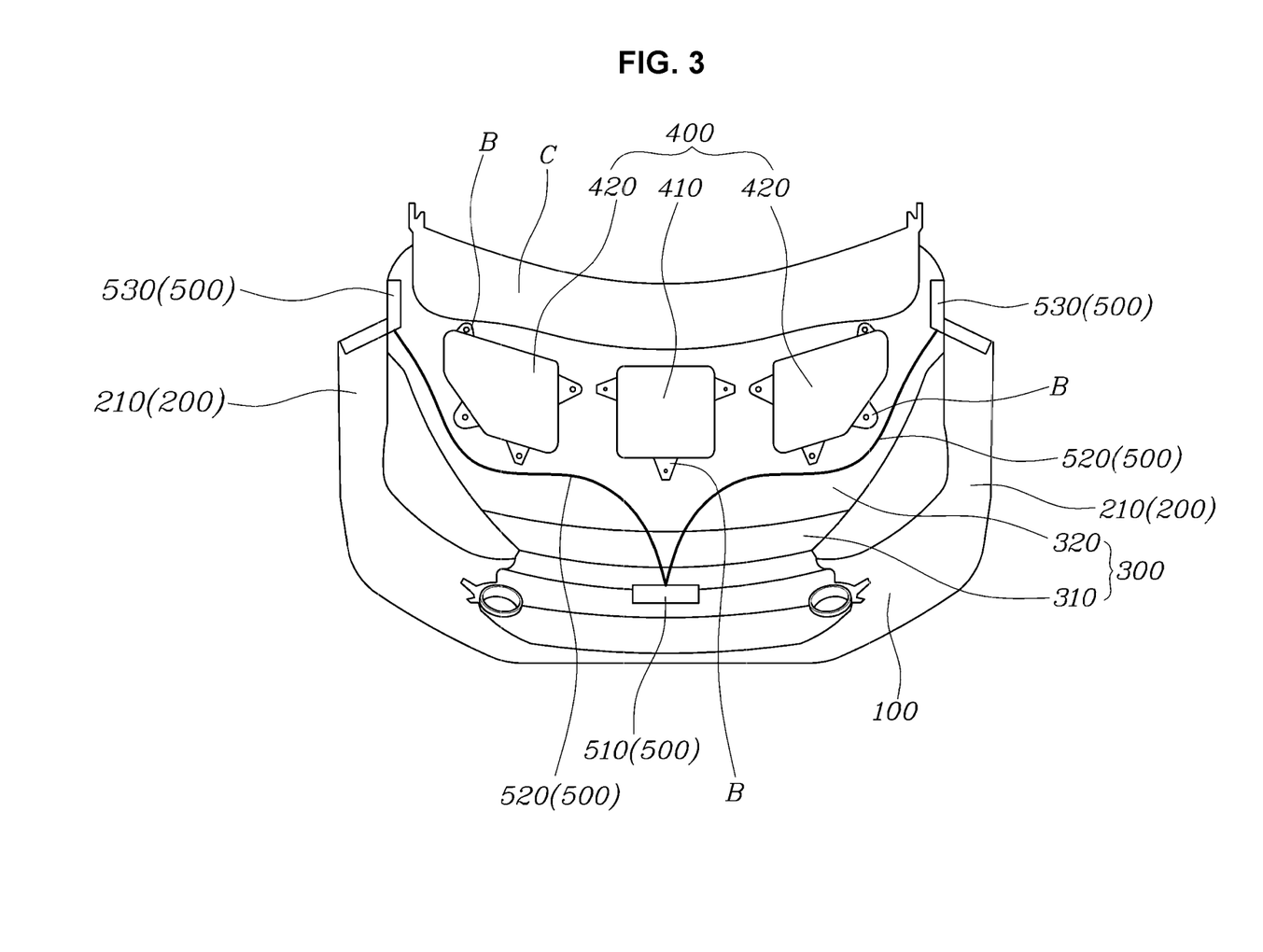
FIG. 3 is a view illustrating reservoir tanks and a latch unit provided at the front part assembly for a mobility device according to the embodiment of the present disclosure.
Figure 4:
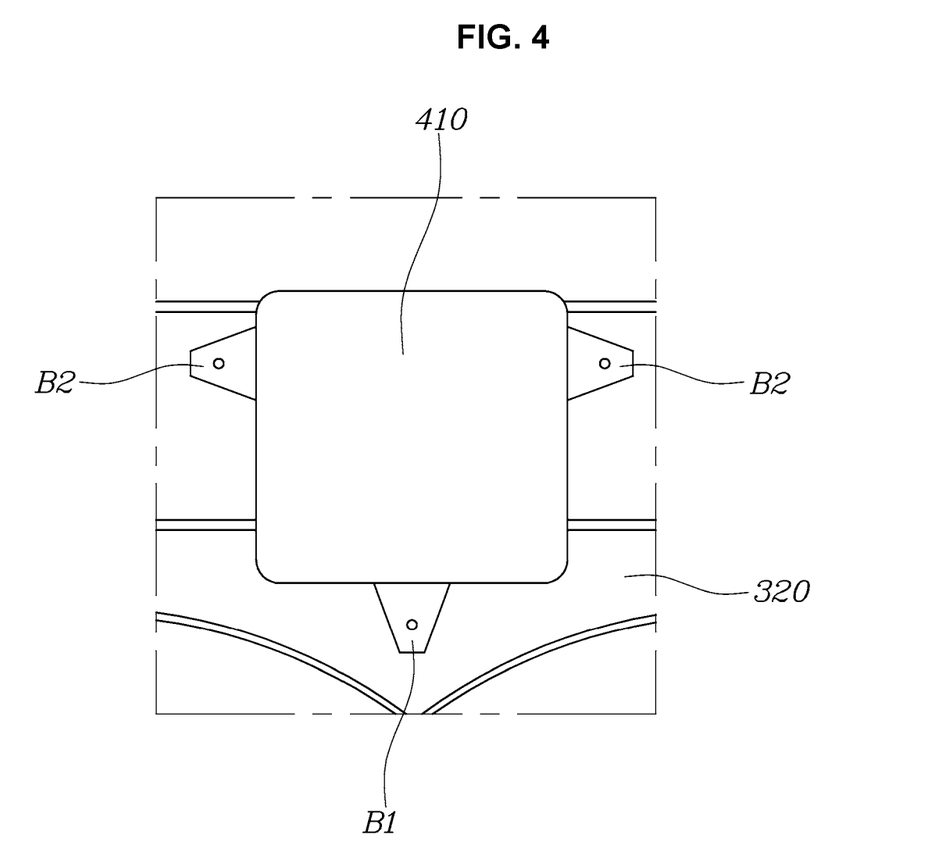
FIG. 4 is a view illustrating an intermediate reservoir tank of the front part assembly for a mobility device according to the embodiment of the present disclosure.
Figure 5:
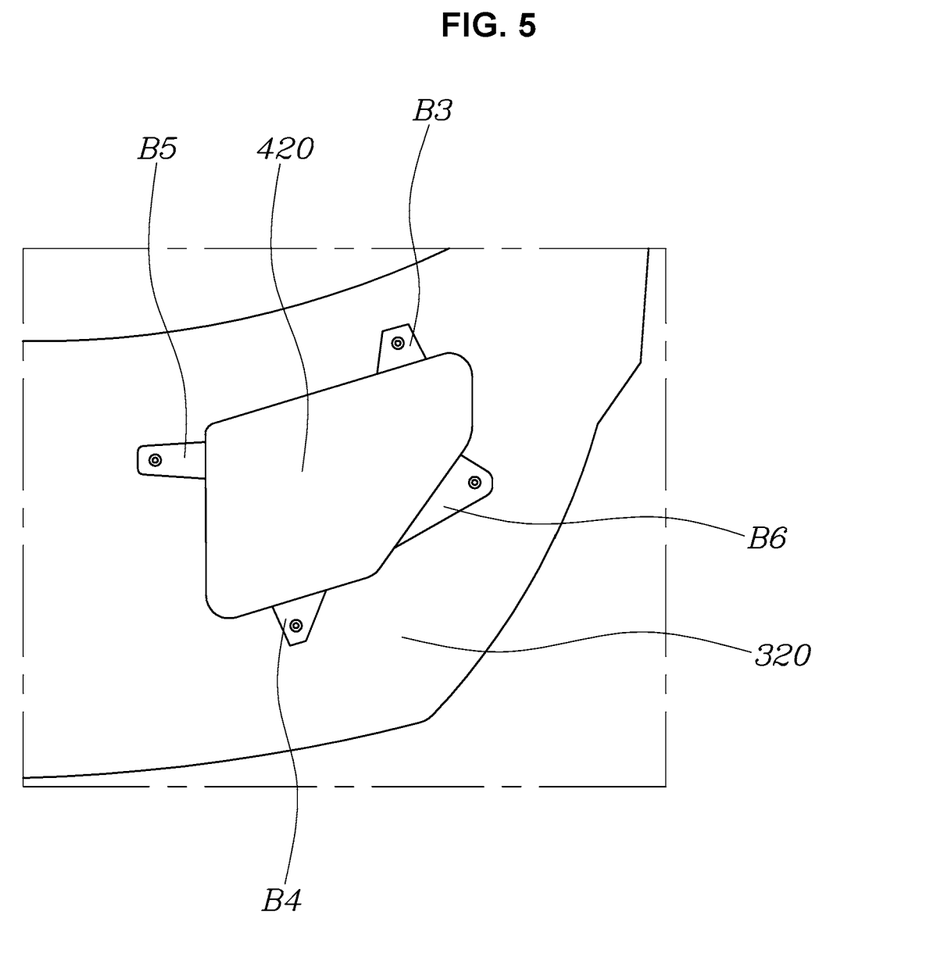
FIG. 5 is a view illustrating a side reservoir tank of the front part assembly for a mobility device according to the embodiment of the present disclosure.
Figure 6:
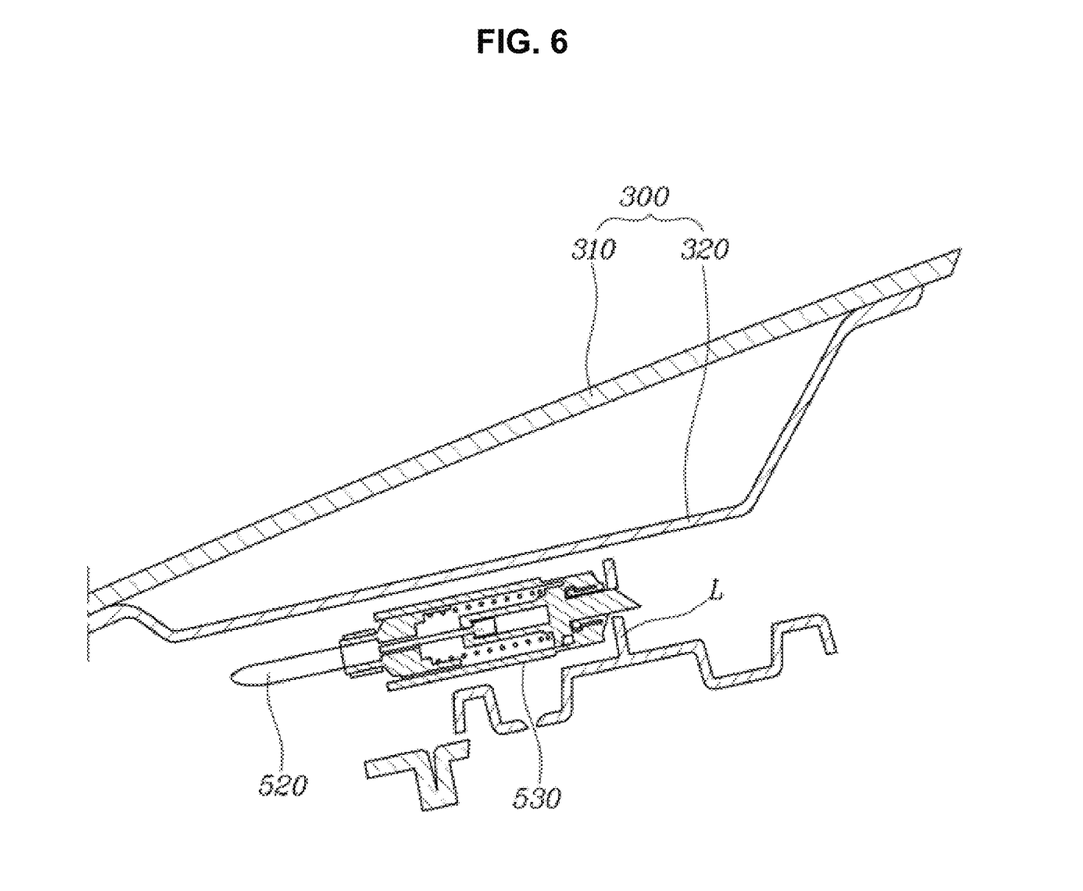
FIG. 6 is a view illustrating the latch unit of the front part assembly for a mobility device according to the embodiment of the present disclosure.
Figure 7:
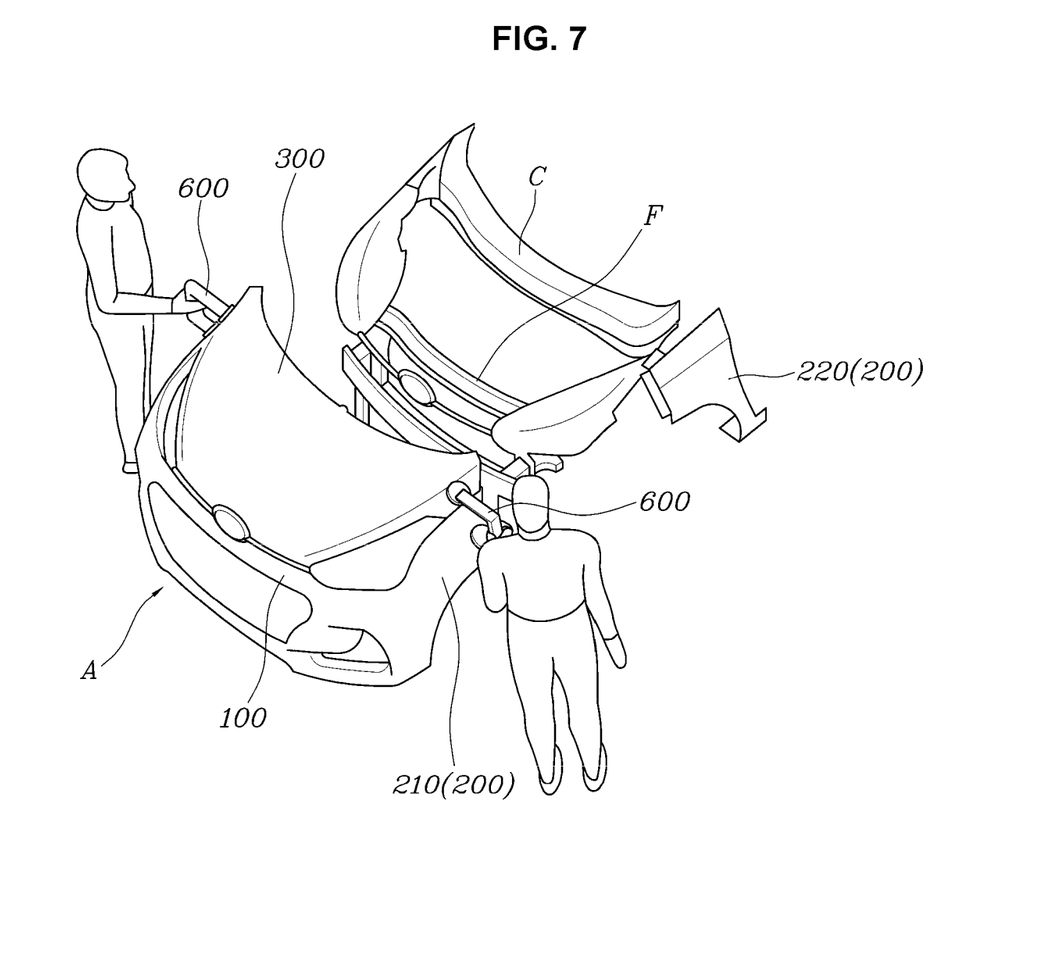
FIG. 7 is a view illustrating assembly of a front-part-integrated mobility device according to an embodiment of the present disclosure.
Figure 8:
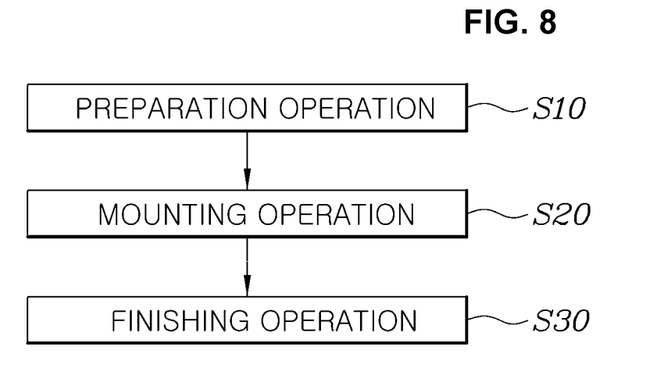
FIG. 8 is a flowchart illustrating a method of assembling the front-part-integrated mobility device according to the embodiment of the present disclosure.
Figure 9:
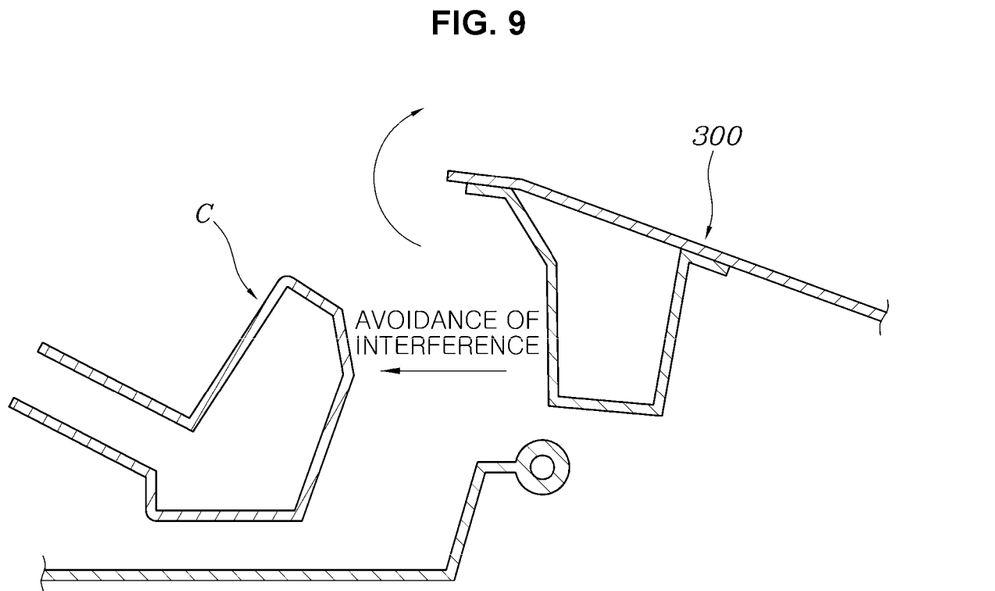
FIG. 9 is a view illustrating assembly of the front-part-integrated mobility device according to the embodiment of the present disclosure.
Figure 10:
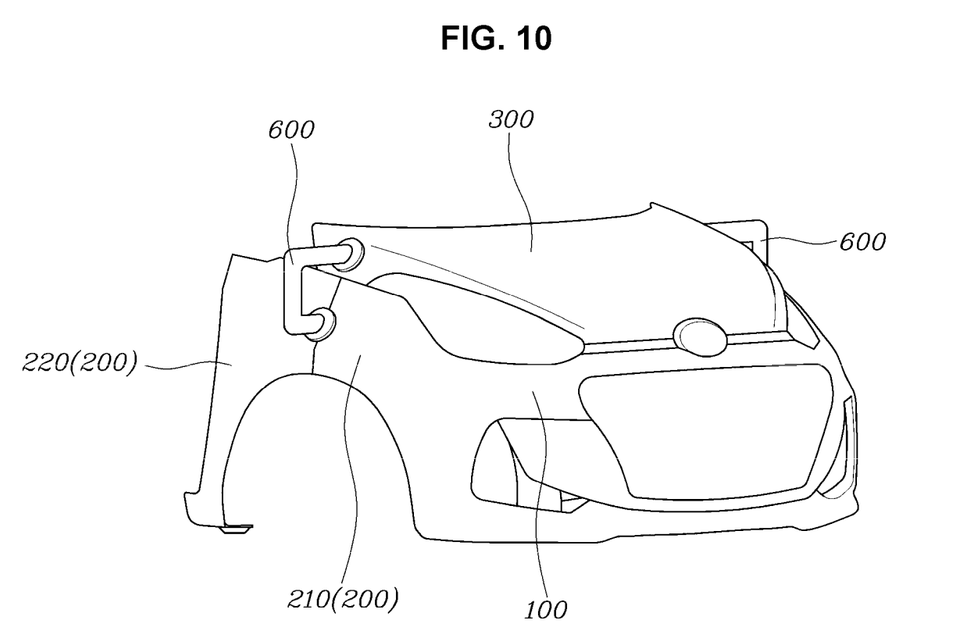
FIG. 10 is a view illustrating assembly of the front-part-integrated mobility device according to the embodiment of the present disclosure by means of a carrier.

FIG. 1 is a view illustrating a front part assembly for a mobility device according to an embodiment of the present disclosure. FIG. 2 is a side view of the front part assembly for a mobility device according to the embodiment of the present disclosure. FIG. 3 is a view illustrating reservoir tanks and a latch unit provided at the front part assembly for a mobility device according to the embodiment of the present disclosure. FIG. 4 is a view illustrating an intermediate reservoir tank of the front part assembly for a mobility device according to the embodiment of the present disclosure. FIG. 5 is a view illustrating a side reservoir tank of the front part assembly for a mobility device according to the embodiment of the present disclosure. FIG. 6 is a view illustrating the latch unit of the front part assembly for a mobility device according to the embodiment of the present disclosure. FIG. 7 is a view illustrating assembly of a front-part-integrated mobility device according to an embodiment of the present disclosure. FIG. 8 is a flowchart illustrating a method of assembling the front-part-integrated mobility device according to the embodiment of the present disclosure. FIG. 9 is a view illustrating assembly of the front-part-integrated mobility device according to the embodiment of the present disclosure. FIG. 10 is a view illustrating assembly of the front-part-integrated mobility device according to the embodiment of the present disclosure by means of a carrier.

As illustrated in FIGS. 1 to 3, the front part assembly A of a mobility device according to an embodiment of the present disclosure is constructed such that a bumper 100, a fender 200, and a hood 300, which constitute the front part of a mobility device, are integrally formed, the bumper 100 and the fender 200 are connected to each other so as to define an internal space, and the hood 300 is rotatably connected at the front end thereof to the bumper 100 so as to allow the rear end thereof to be rotatable vertically to thus open or close the internal space.

The front part assembly A of a mobility device according to an embodiment of the present disclosure is constructed such that the bumper 100, the fender 200, and the hood 300 are integrally formed, the internal space is defined between the bumper 100 and the fender 200, and the hood 300 is rotated to open and close the internal space. Here, the internal space may serve as an engine compartment or a front trunk.

In other words, the front part assembly A is constructed such that the bumper 100 configured to absorb forward impacts and to achieve an attractive design and the fender 200, surrounding a wheel, are integrally formed so as to define the internal space therebetween, and the internal space, which serves as an engine compartment or a trunk, is connected to the bumper 100 so as to open and close the internal space.

The front part assembly A is made of a plastic material to save weight. Accordingly, the bumper 100, the fender 200, and the hood 300 are integrally formed from a plastic material through injection molding.

In a conventional technology, the bumper 100, the fender 200, and the hood 300 are prepared separately, and are assembled with one another via hinge devices, thereby deteriorating fabrication efficiency. However, since the front part assembly A according to the present disclosure is constructed such that the bumper 100, the fender 200, and the hood 300 are integrally formed from a plastic material, it is possible to easily produce the front part assembly A through injection molding.

As mentioned above, because the bumper 100 and the hood 300, which constitute the front part assembly A, are made of a flexible plastic material, the hood 300 is capable of being rotated vertically so as to open and close the internal space by virtue of deformation of the plastic material.

Specifically, the hood 300 may be composed of an outer panel 310, which is rotatably connected to the bumper 100, and an inner panel 320 coupled to the inner surface of the outer panel 310. The inner panel 320 may be made of a material having higher rigidity than the outer panel 310.

As illustrated in FIG. 3, the outer panel 310 is molded together with the bumper 100 so as to be formed integrally with the bumper 100. The inner panel 320 is coupled to the inner surface of the outer panel 310 so as to increase the overall rigidity of the hood 300. Here, the inner panel 320 may be made of steel, which is a rigid material, and may be formed so as to cover the inner surface of the outer panel 310 to thus increase the rigidity of the outer panel 310.

Accordingly, the hood 300 allows other components to be easily mounted thereto via the inner panel 320. Furthermore, because the outer panel 310 is made of a flexible material and the inner panel 320 is made of a rigid material, when an external impact occurs, the outer panel 310 absorbs the external impact while the inner panel 320 supports the impact load, thereby improving the ability of the hood 300 to withstand external collision.

The inner surface of the inner panel 320 is provided with a reservoir tank 400, which is mounted thereto via a plurality of brackets B.

Because the reservoir tank 400 is mounted to the inner panel 320 of the hood 300, the internal space for accommodating therein the reservoir tank 400 is reduced. The reservoir tank 400 may include a plurality of reservoir tanks depending on the practical application or the required amount of cooling medium.

The reservoir tank 400 may be mounted to the inner panel 320 via the brackets B. The reservoir tank 400 may be divided into a plurality of reservoir tanks, and the rigidity of the inner panel 320 may be increased by virtue of the brackets B connected to the reservoir tanks 400.

In other words, the reservoir tank 400 may include an intermediate reservoir tank 410 and two side reservoir tanks 420, which are disposed at lateral sides of the intermediate reservoir tank 410 and are arranged on the inner surface of the inner panel 320 in a crosswise direction.

As mentioned above, the reservoir tank 400 may include a plurality of reservoir tanks, that is, the intermediate reservoir tank 410 disposed in the center of the inner panel 320, and the side reservoir tanks 420 disposed at the lateral sides of the intermediate reservoir tank 410. Although the intermediate reservoir tank 410 may also be divided into a plurality of reservoir tanks, the embodiment of the present disclosure provides a single intermediate reservoir tank 410 and two side reservoir tanks 420 because the reservoir tanks 400 are symmetrically arranged on the inner surface of the inner panel 320 and it is possible to satisfy the practical application and the required capacity only when the intermediate reservoir tank 410 and the side reservoir tanks 420 are provided.

Accordingly, because the inner panel 320 is provided with the intermediate reservoir tank 410 and the side reservoir tanks 420 of the reservoir tank 400, which are arranged at predetermined intervals in the crosswise direction of the inner panel 320, the overall rigidity of the hood 300 including the inner panel 320 is increased by virtue of the brackets B configured to couple the intermediate reservoir tank 410 and the side reservoir tanks 420 to the inner panel 320.

As illustrated in FIG. 4, the brackets B are respectively provided at the front end and the lateral ends of the intermediate reservoir tank 410. The bracket B1 provided at the front end of the intermediate reservoir tank 410 is disposed in the center of the intermediate reservoir tank 410, and the brackets B2 provided at the lateral ends of the intermediate reservoir tank 410 are symmetrically disposed in a crosswise direction.

As mentioned above, the intermediate reservoir tank 410, which is disposed in the center of the inner panel 320, is provided at the front end and the lateral ends thereof with the brackets B such that the intermediate reservoir tank 410 is mounted on the inner panel 320 via the brackets B. Here, because the brackets B are provided at the front end and the lateral ends of the intermediate reservoir tank 410, it is possible to absorb impacts generated at the front portion of the mobility device and to increase the coupling strength of the intermediate reservoir tank 410. Although the bracket B may also be provided at the rear end of the intermediate reservoir tank 410, the brackets B are provided only at the front end and the lateral ends of the intermediate reservoir tank 410, because the force caused by the collision is distributed to the side reservoir tanks 420, which are provided at the lateral sides of the inner panel 320.

As illustrated in FIG. 5, each of the side reservoir tanks 420 is provided with a plurality of brackets B at the front end, the rear end, the inner end, and the outer end thereof. The brackets B4 and B3, which are provided at the front end and the rear end of the side reservoir tank 420, and the brackets B5 and B6, which are provided at the inner end and the outer end of the side reservoir tank 420, are disposed so as to be circumferentially spaced apart from one another.

Because the side reservoir tank 420 is provided with the brackets B at the front end, the rear end, the inner end and the outer end thereof and is coupled to the inner panel 320 via the brackets B, the side reservoir tank 420 is securely coupled to the inner panel 320.

Among the brackets B, the brackets B3 and B4, which are respectively provided at the rear end and the front end of the side reservoir tank 420, are disposed so as to be spaced apart from each other in a direction inclined with respect to the forward and backward direction, and the brackets B5 and B6, which are respectively provided at the inner end and the outer end of the side reservoir tank 420, are disposed so as to be spaced apart from each other in a direction inclined with respect to the crosswise direction. In other words, because each of the side reservoir tanks 420 is firmly fixed to the inner panel 320 by means of the plurality of brackets B and because the brackets B3 and B4, which are provided at the rear and front ends of the side reservoir tank 420, are disposed in an inclined direction and the brackets B5 and B6, which are respectively provided at the inner and outer ends of the side reservoir tank 420, are also disposed in an inclined direction, an impact applied to the inner panel 320 is distributed.

Specifically, the bracket B3 provided at the rear end of the side reservoir tank 420 is disposed so as to be spaced outwards apart from the bracket B4 provided at the front end of the side reservoir tank 420, and the bracket B5 provided at the inner end of the side reservoir tank 420 is disposed so as to be spaced backwards apart from the bracket B6 provided at the outer end of the side reservoir tank 420.

As described above, because the bracket B3 provided at the rear end of the side reservoir tank 420 is disposed so as to be spaced outwards apart from the bracket B4 provided at the front end of the side reservoir tank 420, when a collision occurs at the front portion of the mobility device, a load path, through which the impact caused by the collision is transmitted to the bracket B3 provided at the rear end from the bracket B4 provided at the front end via the intermediate tank 410, is formed.

Furthermore, because the bracket B5 provided at the inner end of the side reservoir tank 420 is disposed so as to be spaced backwards apart from the bracket B6 provided at the outer end of the side reservoir tank 420, when a collision occurs at a lateral side of the mobility device, a load path, through which the impact caused by the collision is transmitted to the bracket B5 provided at the inner end from the bracket B6 provided at the outer end via the intermediate tank 410, is formed.

Because the side reservoir tank 420 is provided with the plurality of brackets B, the side reservoir tank 420 is capable of being firmly fixed to the inner panel 320. In addition, because the brackets B are disposed so as to be spaced apart from each other with respect to the longitudinal direction and the crosswise direction in consideration of the collision direction such that a load path is formed, the hood 300 is imparted with sufficient rigidity to withstand a collision.

As illustrated in FIG. 3, the bumper 100 is provided with a latch unit 500 configured to selectively permit rotation of the hood 300. The latch unit 500 is selectively engaged with a holder L (shown in FIG. 6), which is provided at the frame F (shown in FIG. 7), a cowl C (shown in FIG. 7), or the fender 200 of the mobility device.

In other words, the latch unit 500 may be mounted to the bumper 100. The latch unit 500 is engaged with the holder L, which is provided at the frame F, the cowl C or the fender 200, so as to hold the hood 300 in position when the internal space is closed by the hood 300, and is disengaged from the holder L so as to allow the hood 300 to be opened when the latch unit 500 is manipulated.

The latch unit 500 includes a lever portion 510 provided at the bumper 100, a wire 520 extending from the lever portion 510, and a latch portion 530, which is connected to the wire 520 and is separated from the holder L by the pulling force generated by manipulation of the lever portion 510.

In other words, the latch unit 500 is composed of the lever portion 510, the wire 520, and the latch portion 530. The lever portion 510 is configured to be movable at the bumper 100 in a forward and backward direction. When the lever portion 510 is moved by manipulation of a user, the wire 520 is pulled, and the latch portion 530 is thus separated from the holder L, thereby releasing the engagement between the latch unit 500 and the holder L.

The latch portion 530 is provided at a rear portion of the hood 300, and is selectively engaged with or disengaged from the holder L by the action of the lever portion 510 and the wire 520. As illustrated in FIG. 6, the latch portion 530 may be configured to have the form of a pin, which is engaged with or disengaged from the holder L depending on application of pulling force of the wire 520, and the holder L is provided at the frame F or the cowl C of the mobility device and has therein a hole into which the latch portion 530 is selectively inserted.

As described above, the front part assembly A according to the embodiment of the present disclosure is mounted to the frame F of the mobility device and the latch unit 500 thereof is mounted to the bumper 100 such that the hood 300 is selectively closed or opened when the latch unit 500 is selectively engaged with or disengaged from the holder L.

As illustrated in FIGS. 1 and 7, the fender 200 is composed of a front fender 210 integrally coupled to the bumper 100 and a rear fender 220 fixed to the frame F of the mobility device. The front fender 210 and the rear fender 220 may be configured so as to slide relative to each other in a forward and backward direction to thus be connected to each other.

Accordingly, the front fender 210 is formed so as to have the shape of a front portion of the entire fender 200, and the rear fender 220 is formed so as to have the shape of the remaining rear portion of the entire fender 200. The front fender 210 is integrally coupled to the bumper 100 and the hood 300, and the rear fender 220 is separated from the front fender 210 and is fixed to the frame F of the mobility device. Accordingly, when the front part assembly A is mounted on the frame F of the mobility device, the front fender 210 is slidably connected to the rear fender 220.

In other words, because a sliding guide structure is provided at the rear end of the front fender 210 and the front end of the rear fender 220, the front fender 210 is capable of being assembled with the rear fender 220 in a sliding guide manner.

Consequently, it is possible to improve the efficiency of assembly of the front fender 210 with the rear fender 220. Furthermore, because the front fender 210 is guide along the rear fender 220 and is assembled therewith, it is possible to easily couple the front part assembly A to the frame F of the mobility device.

As illustrated in FIG. 7, the front-part-integrated mobility device according to the embodiment of the present includes the front part assembly A, which is constructed such that the bumper 100, the front fender 210, and the hood 300, which constitute the front part of the mobility device, are integrally formed, the bumper 100 is connected to the front fender 210 so as to define the internal space therebetween, and the front end of the hood 300 is rotatably connected to the bumper 100 such that the internal space is opened or closed by vertical rotation of the rear end of the hood 300, and the frame F, which is coupled at the front portion thereof to the front part assembly A and to which the cowl C fitted with the hood 300 and the rear fender 220 fitted with the front fender 210 are coupled.

In other words, the front part assembly A is constructed such that the bumper 100, which is configured to absorb impacts applied to the front portion of the mobility device and to provide an attractive design, and the front fender 210 surrounding a wheel are integrally formed so as to define the internal space therebetween, and the hood 300 is connected to the bumper 100 so as to open and close the internal space, which serves as an engine compartment or a trunk.

The frame F of the mobility device, to which the front part assembly A is mounted, is provided with the cowl C fitted with the hood 300 of the front part assembly A and the rear fender 220 fitted with the front fender 210. Accordingly, when the front part assembly A is mounted on the frame F, the hood 300 is fitted with the cowl C, and the front fender 210 is fitted with the rear fender 220, thereby finishing the front part of the mobility device.

Here, the front fender 210 and the rear fender 220 are constructed such that, when the front fender 210 is moved backwards, the front fender 210 is slid along the rear fender 220 and is coupled thereto.

In other words, because the guide structure is provided at the rear end of the front fender 210 and the front end of the rear fender 220, the front fender 210 is slidably guided along the rear fender 220 and is assembled therewith.

Consequently, it is possible to improve the efficiency of assembly between the front fender 210 and the rear fender 220. Furthermore, because the front fender 210 is guided along the rear fender 220 and is assembled therewith, it is possible to easily couple the front part assembly A to the frame F of the mobility device.

The front-part-integrated mobility device according to the embodiment of the present disclosure may be assembled through the following assembly process.

As illustrated in FIG. 8, the process of assembling the front-part-integrated mobility device according to the embodiment of the present disclosure includes a preparation operation S10 of rotating the hood 300 of the front part assembly A relative to the bumper 100 to open the internal space, a mounting operation S20 of moving the front part assembly A to the front portion of the frame F to fit the front fender 210 with the rear fender 220 to thus couple the front part assembly A including the front fender 210 to the frame F together with the rear fender 220, and a finishing operation S30 of rotating the hood 300 of the front part assembly A to close the internal space.

As illustrated in FIG. 9, in the preparation operation S10, the front part assembly A is mounted on the frame F of the mobility device in the state in which the hood 300 of the front part assembly A is rotated so as to open the internal space. When the hood 300 of the front part assembly A is positioned so as to close the internal space, the inner panel 320 may interfere with the frame F or the cowl C provided at the frame F when the front part assembly A is mounted on the frame F of the mobility device. Accordingly, the hood 300 of the front part assembly A is rotated so as to open the internal space.

In the preparation operation S10, a carrier 600 (shown in FIG. 10), which is configured to be detachably coupled to the hood 300 and the bumper 100 of the front part assembly A, is coupled to the hood 300 and the bumper 100 in the state in which the hood 300 is open, thereby maintaining the open state of the hood 300. Thereafter, the front part assembly A is moved.

As illustrated in FIGS. 7 and 10, the front part assembly A is moved by means of the carrier 600. Here, because the carrier 600 is coupled to the hood 300 and the bumper 100 in the state in which the hood 300 is open, it is possible to maintain the open state of the hood 300.

Consequently, a worker is able to maintain the open state of the hood 300 of the front part assembly A using the carrier 600 and is able to move the front part assembly A to the frame F of the mobility device to thus mount the front part assembly A thereto.

Subsequently, in the mounting operation S20, the front part assembly A is moved to the front portion of the frame F so as to fit the front fender 210 with the rear fender 220 to thus couple the front part assembly A including the front fender 210 to the frame F together with the rear fender 220. Here, because the guide structure is provided at the front fender 210 and the rear fender 220, the front fender 210 is slid along the rear fender 220 and is assembled therewith, thereby allowing the front part assembly A to be easily mounted on the frame F of the mobility device. Furthermore, because the front part assembly A is linearly moved to the frame F of the mobility device and is mounted thereto, the front part assembly A is simply mounted on the frame F of the mobility device.

After the front part assembly A is mounted on the frame F, the finishing operation S30 of rotating the hood 300 of the front part assembly A to close the internal space is performed.

As is apparent from the above description, since the front part assembly for a mobility device, the front-part-integrated mobility device including the same, and the method of assembling the same according to the present disclosure are constructed such that the hood 300, the bumper 100, and the fender 200 are integrated into a single component, the weight of the front part assembly and the manufacturing costs thereof are reduced.

Furthermore, since the hood 300, the bumper 100, and the fender 200 are integrally formed, the number of seams is reduced, thereby improving the feeling of a unified appearance. Furthermore, since the rigidity of the hood 300 is increased by virtue of the connection structure for components such as the reservoir tanks 400, the rigidity of the hood 300 is increased, thereby improving the ability to withstand a collision.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

The invention claimed is:

1. A front part assembly for a mobility device comprising:
a bumper fascia;
a fender; and
a hood;
wherein the bumper fascia, the fender, and the hood are integrally formed, and wherein the bumper fascia and the fender are connected to each other to define an internal space therebetween, and the hood is rotatably connected at a front end to the bumper fascia such that a rear end of the hood is rotated vertically to open and close the internal space; and
wherein the fender includes a front fender integrally coupled to the bumper fascia and a rear fender fixed to a frame of the mobility device, wherein the front fender and the rear fender are connected to each other by sliding in forward and backward directions.

2. The front part assembly for a mobility device according to claim 1, wherein the bumper fascia, the fender, and the hood are integrally formed from a plastic material through injection molding.

3. The front part assembly for a mobility device according to claim 1, wherein the hood includes an outer panel rotatably connected to the bumper fascia, and an inner panel coupled to an inner surface of the outer panel, the inner panel being made of a material having higher rigidity than a rigidity of the outer panel.

4. The front part assembly for a mobility device according to claim 1, wherein an inner surface of the hood includes a plurality of reservoir tanks.

5. The front part assembly for a mobility device according to claim 4, wherein the plurality of reservoir tanks include an intermediate reservoir tank and side reservoir tanks disposed at lateral sides of the intermediate reservoir tank arranged in a lateral direction.

6. The front part assembly for a mobility device according to claim 5, wherein the intermediate reservoir tank includes a front bracket at a front end, an inner bracket at an inner end, and an outer bracket at an outer end, wherein the front bracket is disposed in a center of the intermediate reservoir tank, and the inner and outer brackets are disposed in a bilaterally symmetrical arrangement.

7. The front part assembly for a mobility device according to claim 6, wherein each of the side reservoir tanks includes a front bracket at a front end, a rear bracket at a rear end, an inner bracket at an inner side, and an outer bracket at an outer side, wherein the front bracket and the rear bracket are spaced apart from each other in a direction inclined with respect to a lateral direction, and the inner bracket and the outer bracket are spaced apart from each other in a direction inclined with respect to a longitudinal direction.

8. The front part assembly for a mobility device according to claim 7, wherein the rear bracket is spaced outwards apart from the front bracket, and the inner bracket is spaced backwards apart from the outer bracket.

9. The front part assembly for a mobility device according to claim 1, wherein the bumper fascia includes a latch unit configured to selectively allow rotation of the hood, and a latch portion of the latch unit is selectively engaged with a holder provided at a frame, a cowl, or the fender of the mobility device.

10. The front part assembly for a mobility device according to claim 9, wherein the latch unit includes a lever portion positioned at the bumper fascia, and the latch portion connected to a wire extending from the lever portion and disengaged from the holder upon application of pulling force caused by manipulation of the lever portion.

11. A front-part-integrated mobility device comprising:
 a front part assembly including a bumper fascia, a front fender, and a hood being integrally formed, wherein the bumper fascia and the front fender are connected to each other to define an internal space therebetween, and the hood is rotatably connected at a front end to the bumper fascia such that a rear end of the hood is rotated vertically to open and close the internal space; and
 a frame coupled at a front portion to the front part assembly, and coupled to a cowl fitted with the hood and a rear fender fitted with the front fender.

12. The front-part-integrated mobility device according to claim 11, wherein the front fender is connected to the rear fender by sliding the front fender backwards along the rear fender.

13. A method of assembling the front-part-integrated mobility device according to claim 11, comprising:
 rotating the hood of the front part assembly to open the internal space;
 moving the front part assembly to the front portion of the frame to fit the front fender with the rear fender to thus couple the front part assembly including the front fender to the frame together with the rear fender; and
 rotating the hood of the front part assembly to close the internal space.

14. The method according to claim 13, wherein, when moving the front part assembly, the front part assembly is moved by means of a carrier configured to be detachably coupled to the hood and the bumper fascia of the front part assembly in a state in which the hood is open to maintain the state in which the hood is open.

\* \* \* \* \*